June 22, 1943.  B. N. ADAMS  2,322,210
BATTERY
Filed Dec. 18, 1941

Bert N. Adams,
INVENTOR.

BY
Victor J. Evans & Co.
ATTORNEYS

Patented June 22, 1943

2,322,210

UNITED STATES PATENT OFFICE 2,322,210

BATTERY

Bert N. Adams, Queens Village, N. Y.

Application December 18, 1941, Serial No. 423,548

11 Claims. (Cl. 136—100)

This invention relates to batteries.

An object of my invention is to provide a novel battery characterized by linear potential and capacity, wherein the battery is so designed as to eliminate acids such as are employed in conventional storage batteries, and in which the battery is of such a nature as to eliminate the release of dangerous fumes.

Another object is to provide a battery which is relatively light in weight with respect to capacity and in which the battery may be manufactured and distributed to the trade in a dry condition and rendered serviceable by merely filling the container with water.

Figure 1:
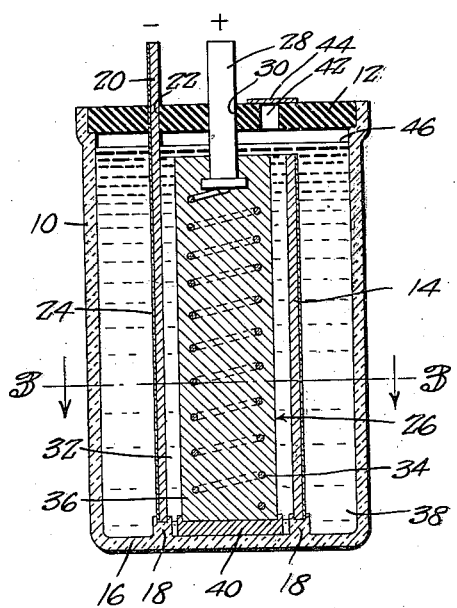
Figure 1 is a sectional view of a battery in accordance with my invention.
Figure 2:
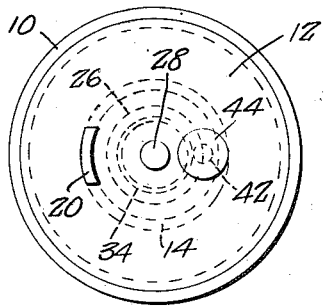
Figure 2 is a top plan view.
Figure 3:
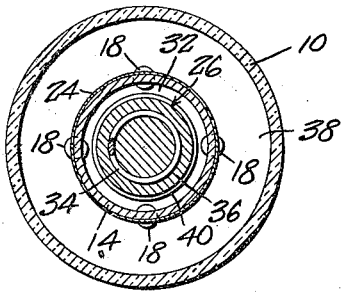
Figure 3 is a sectional view taken along the line 3—3 of Figure 1.

In the embodiment selected for illustration, I make use of a container 10 provided with a closure or cover 12 of insulative material. The container 10 may comprise glass or any other material which is waterproof. Inside the container 10 is arranged an electro-positive electrode 14 comprising pure magnesium. The electro-positive electrode 14 is in the form of an open ended tube of a length slightly less than the height of the container 10. Projecting upwardly from the bottom 16 of the container are notched ears 18 in which the lower end of the electro-positive electrode 14 is supported. An extension 20 is provided at the upper end of the electro-positive electrode 14, which extension projects through an opening 22 in the cover 12 to constitute one terminal of the battery. The outer surface of the electro-positive electrode 14 is provided with a coating of tar 24.

Arranged concentrically within the electropositive electrode 14 is an electro-negative electrode 26 in the form of a cylinder coextensive in length with the electro-positive electrode 14. Embedded in the upper end of the electro-negative electrode 26 is a copper terminal 28 extending through an opening 30 in the cover 12. The electronegative electrode 26 is of uniform diameter less than the inside diameter of the electropositive electrode 14 so as to provide a space 32 for the liquid contained in the battery. To the terminal 28 is connected one end of a copper coil 34 embedded in the core 36. The electropositive electrode 14 is of considerably smaller outside diameter than the inside diameter of the container 10 to provide a space 38 for the liquid, which space has communication with the space 32 at the bottom of the battery by reason of the ears 18 and also by reason of the fact that the electropositive electrode terminates short of the cover 12.

The body 36 of the electronegative electrode 26 comprises fused cuprous chloride (CuCL). In manufacturing the body 36, the coil 34 and the terminal 28 are arranged in a mold and the latter supplied with the requisite amount of cuprous chloride poured from a heated crucible. A piece of wood carbon is placed on the top of the cuprous chloride in the crucible and the latter is heated to a temperature ranging between 400° and 500° centigrade at which the cuprous chloride may be poured. The wood carbon constitutes a catalytic agent which renders the electronegative electrode 26 successful for the purpose intended, the exact chemical action being unknown to me.

After the electronegative electrode 36 is removed from the crucible, it is cooled and dipped in a 66° Baumé solution of sulphuric acid. While still dripping wet, the electrode 26 is covered with aluminium powder to prevent oxidation thereof. The electrode 26 is now ready for use.

The lower end of the electrode 26 is rested on a wood block 40 on the bottom 16. Both terminals 20 and 28 are firmly anchored in the cover 12 so that all the parts are maintained in fixed relationship when assembled with the container.

In designing the battery with respect to capacity, 25 square centimeters of electropositive surface is equal to 250 milliamperes. 2.8 grams of the body 36 of the electronegative electrode is equal to one ampere hour and one gram of the electropositive electrode equals one ampere hour. The outer face of the electropositive electrode is coated to confine the chemical action to its face adjacent the electronegative electrode 26.

For each 250 milliamperes of capacity, .3 gram of sulphate of magnesium is supplied to the container 10. Immediately upon supplying the container with the sulphate of magnesium, the filler and vent opening 42 is sealed by a closure 44. The vent opening may be closed by means of conventional seals of the type which embody a venting function but constitute a seal with respect to liquid. The container is maintained in a sealed condition until the battery is to be put into operation.

The battery is ready for use by merely filling with water, preferably to the level 46 slightly above the upper ends of the electrodes thereof. After filling with water, the battery is ready for use within thirty minutes. However, the battery may be made ready for instant use by supplying the container with one gram of chloride of magnesium in the form of a fused drop.

A battery in accordance with my invention is of relatively simple and durable construction and is exceedingly light in weight with respect to capacity. The battery is characterized by a linear potential and will operate successfully under all temperature conditions. Such a battery may be manufactured at a relatively low cost and is discarded when exhausted. In addition, there is no release of dangerous fumes or chlorine, the battery releasing hydrogen only. No metallic material is used for the container 10.

Without further elaboration, the foregoing will so fully illustrate my invention, that others may, by applying current knowledge, readily adapt the same for use under various conditions of service.

I claim:

1. A battery comprising a liquid container, a magnesium electropositive electrode inside the container and having an exterior terminal, a fused cuprous chloride electronegative electrode, and a terminal connected with said electronegative electrode.

2. A battery comprising a liquid container, a magnesium electropositive electrode inside the container and having an exterior terminal, a fused cuprous chloride electronegative electrode, and a copper terminal having one end embedded in said electronegative electrode.

3. A battery comprising a liquid container, a magnesium electropositive electrode inside the container and having an exterior terminal, a fused cuprous chloride electronegative electrode, a terminal connected with said electronegative electrode, and a liquid body comprising sulphate of magnesium and water bridging said electrodes.

4. A battery comprising a liquid container, a magensium electropositive electrode inside the container and having an exterior terminal, a fused cuprous chloride electronegative electrode, a terminal connected with said electronegative electrode, and a liquid body comprising sulphate of magnesium, water, and fused chloride of magnesium bridging said electrodes.

5. A battery comprising a liquid container, a tubular magnesium electropositive electrode inside the container and provided with a terminal, a fused cuprous chloride electronegative electrode in the form of a stick arranged inside the electropositive electrode in spaced relationship therewith, and a copper terminal having one end embedded in the electronegative electrode.

6. A battery comprising a liquid container, a tubular magnesium electropositive electrode inside the container and provided with a terminal, a fused cuprous chloride electronegative electrode in the form of a stick arranged inside the electropositive electrode in spaced relationship therewith, a copper terminal having one end embedded in the electronegative electrode, and a liquid body comprising sulphate of magnesium and water bridging said electrodes.

7. A battery comprising a liquid container, a tubular magnesium electropositive electrode inside the container and provided with a terminal, a fused cuprous chloride electronegative electrode in the form of a stick arranged inside the electropositive electrode in spaced relationship therewith, a copper terminal having one end embedded in the electronegative electrode, and a liquid body comprising sulphate of magnesium, water and fused chloride of magnesium bridging said electrodes.

8. A battery comprising a liquid container, a tubular magnesium electropositive electrode inside the container and provided with a terminal, a fused cuprous chloride electronegative electrode in the form of a stick arranged inside the electropositive electrode in spaced relationship therewith, a copper terminal having one end embedded in the electronegative electrode, and a protective coating on the outer surface of the electropositive electrode.

9. The invention described in claim 2 wherein there is provided a copper coil embedded in said electronegative electrode and connected with said copper terminal.

10. In a battery, the combination of a magnesium electropositive electrode, and an electronegative electrode comprising cuprous chloride fused with a carbon catalytic agent.

11. In a battery, the combination of a magnesium electropositive electrode, and an electronegative electrode comprising cuprous chloride fused with a wood carbon catalytic agent.

BERT N. ADAMS.